(12) United States Patent
Simon et al.

(10) Patent No.: US 9,961,880 B2
(45) Date of Patent: May 8, 2018

(54) PET TOY WITH TREAT HOLDING RECEPTACLES

(71) Applicants:David F. Simon, Lakeland, FL (US);
Chuck Costello, Louisville, CO (US);
John James Stone, Lakewood, CO
(US); Dominic Mak, Kowloon (HK)

(72) Inventors: David F. Simon, Lakeland, FL (US);
Chuck Costello, Louisville, CO (US);
John James Stone, Lakewood, CO
(US); Dominic Mak, Kowloon (HK)

(73) Assignee: The KONG Company, LLC., Golden, CO (US)

( * ) Notice: Subject to any disclaimer, the term of this patent is extended or adjusted under 35 U.S.C. 154(b) by 142 days.

(21) Appl. No.: 14/053,159

(22) Filed: Oct. 14, 2013

(65) Prior Publication Data

US 2015/0101546 A1    Apr. 16, 2015

(51) Int. Cl.
*A01K 15/02*    (2006.01)

(52) U.S. Cl.
CPC .................. *A01K 15/025* (2013.01)

(58) Field of Classification Search
CPC .... A01K 15/02; A01K 15/025; A01K 15/026; A01K 5/0114; A01K 15/00
USPC .......................... 119/702, 707–711
IPC ............................ A01K 15/00,15/02
See application file for complete search history.

(56) References Cited

U.S. PATENT DOCUMENTS

| | | |
|---|---|---|
| 547,764 A | 10/1895 | Boyum |
| 563,170 A | 6/1896 | Haley et al. |
| 1,100,286 A | 6/1914 | Cornelius |
| D50,377 S | 2/1917 | Ehrlich |
| D70,800 S | 8/1926 | McDonald |
| D75,863 S | 7/1928 | Nicholas |
| 2,115,405 A | 4/1938 | Allen |
| 2,134,812 A | 11/1938 | Dick |
| 2,187,493 A | 1/1940 | Gordon |
| 2,269,941 A | 1/1942 | Jones |
| D177,323 S | 4/1956 | Guest |
| 3,105,457 A | 10/1963 | Krueger |
| D197,889 S | 4/1964 | Hass |
| 3,450,592 A | 6/1969 | Conrad et al. |
| 3,524,267 A | 8/1970 | Barrett et al. |

(Continued)

OTHER PUBLICATIONS

U.S. Appl. No. 14/330,180, filed Jul. 14, 2014, Reiss et al.

(Continued)

*Primary Examiner* — Lisa L Tsang
(74) *Attorney, Agent, or Firm* — Berg Hill Greenleaf & Ruscitti, LLP

(57) ABSTRACT

A pet toy with one or more treat holding receptacles is provided. A receptacle generally conforms to the outer surface or shape of the pet toy, and extends into the interior of the pet toy for holding a primary treat. The receptacle has a plurality of interior engaging surfaces that frictionally hold the primary treat in a desired orientation. An opening is formed through the receptacle for loading secondary treats into an interior of the pet toy. The primary treat has an exposed portion shaped and sized to provide a desired degree of difficulty for an animal to remove the primary treat from the corresponding receptacle. The portion of the primary treat in contact with the engaging surfaces of the receptacle forms a cap or closure, and when all or part of the primary treat is removed, the secondary treats may be dispensed through the opening of the receptacle.

12 Claims, 5 Drawing Sheets

(56) References Cited

U.S. PATENT DOCUMENTS

| | | |
|---|---|---|
| D220,279 S | 3/1971 | Oliver |
| 3,597,874 A | 8/1971 | Ogsbury et al. |
| D221,962 S | 9/1971 | Vennola |
| 3,648,404 A | 3/1972 | Ogsbury et al. |
| 3,694,954 A | 10/1972 | Brumlik |
| 3,808,737 A | 5/1974 | Abrams |
| 3,847,305 A | 11/1974 | Tobin |
| 4,153,248 A | 5/1979 | Holmes et al. |
| 4,170,106 A | 10/1979 | Koslosky |
| 4,240,412 A | 12/1980 | James |
| D260,662 S | 9/1981 | Hida |
| 4,309,038 A | 1/1982 | Spoon |
| D275,410 S | 9/1984 | Panicci |
| D276,544 S | 11/1984 | Piesco |
| D277,983 S | 3/1985 | Kaminski |
| D283,634 S | 4/1986 | Kato et al. |
| 4,617,001 A | 10/1986 | Parein |
| D291,174 S | 8/1987 | Koziol |
| 4,787,191 A | 11/1988 | Shima |
| D301,161 S | 5/1989 | Dunse |
| D308,185 S | 5/1990 | Valkner |
| D313,455 S | 1/1991 | McKinney |
| D328,328 S | 7/1992 | Juarez |
| 5,195,510 A | 3/1993 | Svacina |
| 5,199,716 A | 4/1993 | DeFluiter et al. |
| 5,318,470 A | 6/1994 | Denny |
| D354,995 S | 1/1995 | Barzani |
| D359,092 S | 6/1995 | Brovelli |
| D369,661 S | 5/1996 | Taylor |
| D376,015 S | 11/1996 | Newberry |
| D377,100 S | 12/1996 | Gladieux, Jr. |
| 5,702,105 A | 12/1997 | Glikmann |
| D396,110 S | 7/1998 | Kang |
| D396,226 S | 7/1998 | Davis, Sr. |
| D396,253 S | 7/1998 | Beecher |
| D396,501 S | 7/1998 | Hatting |
| D399,890 S | 10/1998 | Esterle et al. |
| 5,832,877 A | 11/1998 | Markham |
| D403,429 S | 12/1998 | Blanchard |
| 5,947,061 A | 9/1999 | Markham et al. |
| D422,084 S | 3/2000 | Mickelson |
| 6,073,581 A | 6/2000 | Wang |
| 6,076,486 A * | 6/2000 | Oliano .......... 119/709 |
| D431,848 S | 10/2000 | Hubbard |
| 6,129,053 A | 10/2000 | Markham et al. |
| D439,378 S | 3/2001 | Loomis |
| 6,217,408 B1 | 4/2001 | Willinger |
| 6,237,538 B1 | 5/2001 | Tsengas |
| 6,264,522 B1 | 7/2001 | Dickson |
| D447,809 S | 9/2001 | Gladieux, III et al. |
| 6,386,540 B1 | 5/2002 | Stevkovski |
| 6,427,634 B1 | 8/2002 | Mann |
| 6,439,166 B1 | 8/2002 | Markham |
| 6,443,863 B1 | 9/2002 | Dinoffer |
| 6,463,759 B1 | 10/2002 | Garcia et al. |
| 6,470,830 B2 | 10/2002 | Mann |
| 6,526,912 B1 | 3/2003 | Ottoson |
| D473,348 S | 4/2003 | Lang |
| D475,766 S | 6/2003 | Tolosa |
| 6,579,145 B1 | 6/2003 | Maxim |
| 6,626,727 B2 | 9/2003 | Balanchi |
| 6,634,318 B1 * | 10/2003 | Rucker .......... 119/709 |
| D484,248 S | 12/2003 | O'Brien |
| 6,669,526 B2 | 12/2003 | Manville et al. |
| 6,688,258 B1 | 2/2004 | Kolesar |
| D487,327 S | 3/2004 | Andersen et al. |
| 6,761,158 B2 | 7/2004 | Wright |
| 6,846,216 B1 | 1/2005 | Balanchi |
| D501,520 S | 2/2005 | Fraze |
| D503,954 S | 4/2005 | Balanchi |
| 6,899,059 B1 | 5/2005 | Crane et al. |
| 6,899,541 B2 | 5/2005 | Kassai et al. |
| 6,941,895 B2 | 9/2005 | St. Pierre |
| 6,983,722 B2 | 1/2006 | Tepper et al. |
| D520,086 S | 5/2006 | Just et al. |
| 7,063,044 B2 * | 6/2006 | Handelsman ........ A01K 15/026 119/709 |
| D532,113 S | 11/2006 | Huang |
| D535,068 S | 1/2007 | Renforth |
| D536,506 S | 2/2007 | Unlu |
| RE39,563 E | 4/2007 | Markham |
| D544,655 S | 6/2007 | Hass |
| D545,510 S | 6/2007 | Viola |
| 7,246,574 B2 | 7/2007 | Renforth |
| 7,270,085 B2 | 9/2007 | Wolfe, Jr. et al. |
| 7,278,374 B2 | 10/2007 | Mann |
| D554,811 S | 11/2007 | Rutherford |
| D556,913 S | 12/2007 | Laituri |
| D563,493 S | 3/2008 | Nelson et al. |
| 7,354,330 B2 | 4/2008 | Bentley, Jr. |
| 7,389,748 B2 | 6/2008 | Shatoff et al. |
| D577,868 S | 9/2008 | Rutherford et al. |
| D581,543 S | 11/2008 | Ferber et al. |
| D582,049 S | 12/2008 | Ferber et al. |
| D582,563 S | 12/2008 | Ferber et al. |
| D582,998 S | 12/2008 | Chernick et al. |
| D585,162 S | 1/2009 | Partain et al. |
| 7,500,450 B2 | 3/2009 | Wolfe, Jr. et al. |
| 7,506,613 B2 | 3/2009 | Wolfe, Jr. et al. |
| 7,555,997 B2 | 7/2009 | Wolfe, Jr. et al. |
| D599,964 S | 9/2009 | Viola |
| D599,966 S | 9/2009 | Viola |
| 7,591,234 B2 | 9/2009 | Shatoff et al. |
| 7,600,488 B2 | 10/2009 | Mann |
| D614,365 S | 4/2010 | Watson et al. |
| D617,395 S | 6/2010 | Colangelo et al. |
| 7,789,727 B2 | 9/2010 | Chernick et al. |
| 7,806,086 B2 | 10/2010 | Ottoson |
| D627,897 S | 11/2010 | Yde et al. |
| D627,935 S | 11/2010 | Rutherford et al. |
| D629,056 S | 12/2010 | Grimm |
| D634,507 S | 3/2011 | Lawrenson |
| D642,342 S | 7/2011 | Shatoff et al. |
| D650,536 S | 12/2011 | Oblack et al. |
| 8,087,387 B2 | 1/2012 | Gamble et al. |
| 8,141,521 B2 | 3/2012 | Shatoff et al. |
| D660,664 S | 5/2012 | Hsu |
| D660,665 S | 5/2012 | Hsu |
| 8,225,747 B2 | 7/2012 | Markham et al. |
| D665,915 S | 8/2012 | Ma |
| 8,240,273 B2 | 8/2012 | Benson |
| D672,100 S | 12/2012 | Willinger |
| D672,398 S | 12/2012 | Kondou et al. |
| D672,415 S | 12/2012 | Garcia et al. |
| D676,090 S | 2/2013 | Rottje |
| 8,372,111 B2 | 2/2013 | Reyna |
| 8,464,665 B1 | 6/2013 | Scheffler et al. |
| 8,474,404 B2 | 7/2013 | Costello |
| D687,954 S | 8/2013 | Dallman |
| D688,027 S | 8/2013 | Smith et al. |
| 8,516,977 B2 | 8/2013 | Shatoff et al. |
| D700,755 S | 3/2014 | Reiss et al. |
| 2001/0029904 A1 | 10/2001 | Viola |
| 2002/0151248 A1 | 10/2002 | Hsu |
| 2002/0174838 A1 | 11/2002 | Crane et al. |
| 2004/0200434 A1 | 10/2004 | Shatoff et al. |
| 2005/0197211 A1 | 9/2005 | Sullivan et al. |
| 2006/0014467 A1 | 1/2006 | Tusacciu |
| 2007/0044730 A1 | 3/2007 | Axelrod et al. |
| 2007/0077854 A1 | 4/2007 | Jeon et al. |
| 2007/0190892 A1 | 8/2007 | Manvelian |
| 2008/0178821 A1* | 7/2008 | Lamstein .......... A01K 1/035 119/496 |
| 2010/0179593 A1* | 7/2010 | Lamar .......... A61J 17/00 606/236 |
| 2011/0000441 A1 | 1/2011 | Woltmann et al. |
| 2011/0028063 A1 | 2/2011 | Colangelo et al. |
| 2012/0012068 A1 | 1/2012 | Costello |
| 2012/0184174 A1 | 7/2012 | Kwak et al. |
| 2012/0272922 A1* | 11/2012 | Axelrod .......... A01K 15/026 119/709 |
| 2013/0102220 A1 | 4/2013 | Wang et al. |

(56) References Cited

U.S. PATENT DOCUMENTS

2013/0210314 A1   8/2013  Rottjer et al.
2013/0247836 A1*  9/2013  Axelrod et al. .............. 119/709
2014/0261195 A1*  9/2014  Reiss et al. ................ 119/51.01

OTHER PUBLICATIONS

U.S. Appl. No. 29/471,283, filed Oct. 30, 2013, Simon et al.
U.S. Appl. No. 13/801,300, filed Mar. 13, 2013, Reiss et al.
Official Action for U.S. Appl. No. 13/801,300, dated Oct. 9, 2013, 4 pages.
Official Action for U.S. Appl. No. 13/801,300, dated Nov. 14, 2013, 7 pages.
Official Action for U.S. Appl. No. 13/801,300, dated May 15, 2014, 8 pages.
Notice of Allowance for U.S. Appl. No. 13/801,300, dated Jun. 27, 2014, 7 pages.
Supplemental Notice of Allowability for U.S. Appl. No. 13/801,300, dated Aug. 25, 2014, 2 pages.
Notice of Allowance for U.S. Appl. No. 29/448,758, dated Nov. 27, 2013, 17 pages.

* cited by examiner

PET TOY WITH TREAT HOLDING RECEPTACLES

FIELD OF THE INVENTION

The present invention relates to pet toys, and more particularly, to a pet toy incorporating one or more receptacles to hold treats, thereby encouraging an animal to interact with the toy.

BACKGROUND OF THE INVENTION

It is well known that providing an interactive toy for an animal provides many benefits. For dogs, providing a toy that can be chewed over a long period of time provides necessary mastication, and may also provide dental cleaning. For dogs that may experience separation anxiety, providing a toy that can keep the dogs occupied for a long period of time is therapeutic thereby reducing destructive behaviors. Extended periods of play with a toy also increase the activity level of the animal, resulting in beneficial exercise for the animal.

In recent years, the concept of providing a pet toy with integral treats resulted in the development of a number of pet toys with treats that are frictionally held within the toy, or that may be dispensed from the toy by movement of the toy.

One example of a reference disclosing a pet toy with treats includes U.S. Pat. No. 7,555,997. This reference describes an exterior feature for holding treats by a peripheral lip that surrounds and overlaps a corresponding peripheral edge of a first treat, and an interior open space that may be used to hold additional treats. The first treat blocks access to the interior open space.

Another reference disclosing a pet toy with treats is the U.S. Pat. No. 7,500,450. This reference teaches a toy with a hollow interior, a first edible treat that blocks access to the interior, and a second edible treat that interlocks with the first edible treat, the second edible treat extending into the interior of the toy. Additional treats may be placed within the hollow interior.

Yet another reference disclosing pet toys with treats is the U.S. Pat. No. 6,470,830. This reference describes a toy with a trapper cavity or slot to receive a treat. An adjacent bias cavity forms a bias member between the trapper cavity and aperture. Opposing walls of the trapper cavity clamp against surfaces of the treat inserted through the cavity.

Yet another reference in the field of pet toys with integral treats is the U.S. Pat. No. 5,832,877. This reference discloses a pet toy with a longitudinal panel, and first and second lips formed along opposite respective edges of the panel. The edges are folded over to form overlapping areas that serve as receptacles to receive treats.

Yet another reference that discloses a pet toy incorporating treats is the U.S. Pat. No. 6,129,053. This reference teaches a pet toy having an outer surface with one or more recesses for holding treats. The recesses may be of varying depths and shapes to receive different types of treats. Some of the recesses may extend completely through the sidewall of the toy.

One primary goal for these types of pet toys is to encourage an animal's extended interaction with the toy. However, in practice, many of these toys have limitations that do not result in extended interaction. One common drawback of many of these toys is that the toy is constructed in a manner that makes it overly difficult for the animal to access the treats; accordingly, the animal becomes frustrated and loses interest in the toy. Conversely, there are other toys that are constructed in which the treats are too easily accessed, and therefore the animal quickly loses interest in the toy because the treats are quickly consumed. Another drawback of many of the toys is that they may not be made of sufficient quality, and therefore the toy becomes destroyed in a short period of time by the biting and chewing action of the animal. For some of these toys, the animal may ingest pieces of the toy thereby creating a significant health risk for the animal.

One can appreciate from the foregoing that providing a pet toy with treats to sustain an extended interaction with an animal requires a special construction, not only for the toy itself, but also in the manner in which the treat(s) are retained in the toy and dispensed or removed from the toy.

SUMMARY OF THE INVENTION

In accordance with the present invention, a pet toy is provided with one or more treat holding receptacles in which a primary treat is partially exposed and is frictionally held within a corresponding receptacle. The primary treat serves as a cap or closure over the receptacle, and removal of some or the entire treat from engagement with the toy provides access to a hollow interior of the toy through the receptacle. Additional secondary treats may be placed within the hollow interior. If secondary treats are used, removal of the primary treat allows the secondary treats to be dispensed through one or more openings in the receptacle(s).

In a preferred embodiment, the receptacle has a shape to receive the primary treat that has a complementary shape. The primary treat is frictionally held within the receptacle in which all or a significant portion of the periphery of the primary treat engages surfaces of the receptacle. In this manner, adequate frictional engagement is achieved that is capable of effectively holding the primary treat, yet the receptacle does not require overlapping areas or lips that otherwise make loading of the treat more difficult. Accordingly, the receptacle of the present invention achieves a desired retaining function for holding a treat and simplifies loading and reloading of the primary treat by the user.

Further in a preferred embodiment, the material chosen for the pet toy has an elasticity that enables the receptacle to elastically retain a treat of a complementary shape, thereby adequately holding the treat with enough force to prevent the treat from separating from the receptacle without an adequate removal force generated by the animal interacting with the pet toy. Therefore, the pet toy in a preferred embodiment has a selected elastic or elastomeric material characteristic that optimizes the retention of the treat in the receptacle in terms of forces that are generated by an animal in attempts to remove the treat.

Further in a preferred embodiment, the primary treat has at least one side or surface that is exposed so that the animal may immediately recognize the treat within the toy. The treat may be shaped to generally conform to the outer surface of the toy, but may protrude beyond the toy a limited distance that enables an animal's teeth to bite on at least a portion of the treat to facilitate initiation of the animal's interaction. However, the frictional engagement of the primary treat within the toy prevents the primary treat from being too easily removed, thereby encouraging extended interaction with the toy.

According to one preferred embodiment, the pet toy may be spherical shaped with an irregular shaped receptacle formed through a sidewall of the pet toy. The receptacle may also have an irregular shaped opening communicating with the hollow interior of the toy. Such an irregular shaped opening through the receptacle provides an opportunity to load the toy with different sizes and types of secondary treats that can be dispensed through gaps of different sizes in the opening. Further according to this preferred embodiment, the receptacle may have a bone shape in which two arcuate shaped ends are interconnected by a narrower channel. The primary treat may also have a corresponding bone shape in which peripheral edges of the primary treat make frictional contact with surfaces of the receptacle.

According to a method of the invention, a pet toy is provided including an irregular shaped receptacle holding a corresponding shaped primary treat. A portion of the primary treat is exposed, enabling an animal to initiate interaction with the toy by chewing on the exposed portion of the primary treat. Gradual consumption of the primary treat enables secondary treats to be dispensed through the opening in the receptacle not blocked with the primary treat. The pet toy provides different types of activity for the animal to interact with including options to partially consume the primary treat in order to access secondary treats, and/or first consuming the primary treat, and then seeking the secondary treats. Continue motion or movement of the pet toy once the primary treat has been partially or fully removed increases the rate of dispense for the secondary treats.

In one aspect of the invention, a specially constructed receptacle allows the primary treat to be easily attached to the pet toy, yet the primary treat is secured in a manner that prevents the primary treat from being shifted and dislodged with a single biting or pulling action, thereby increasing the interaction time. In accordance with this aspect, the treat itself is also shaped on its exterior exposed surfaces to prevent the primary treat from being removed in a single biting/pulling action.

Other features and advantages of the invention will become apparent from a review of the following detailed description, taken in conjunction with the drawings.

DETAILED DESCRIPTION

Figure 1:
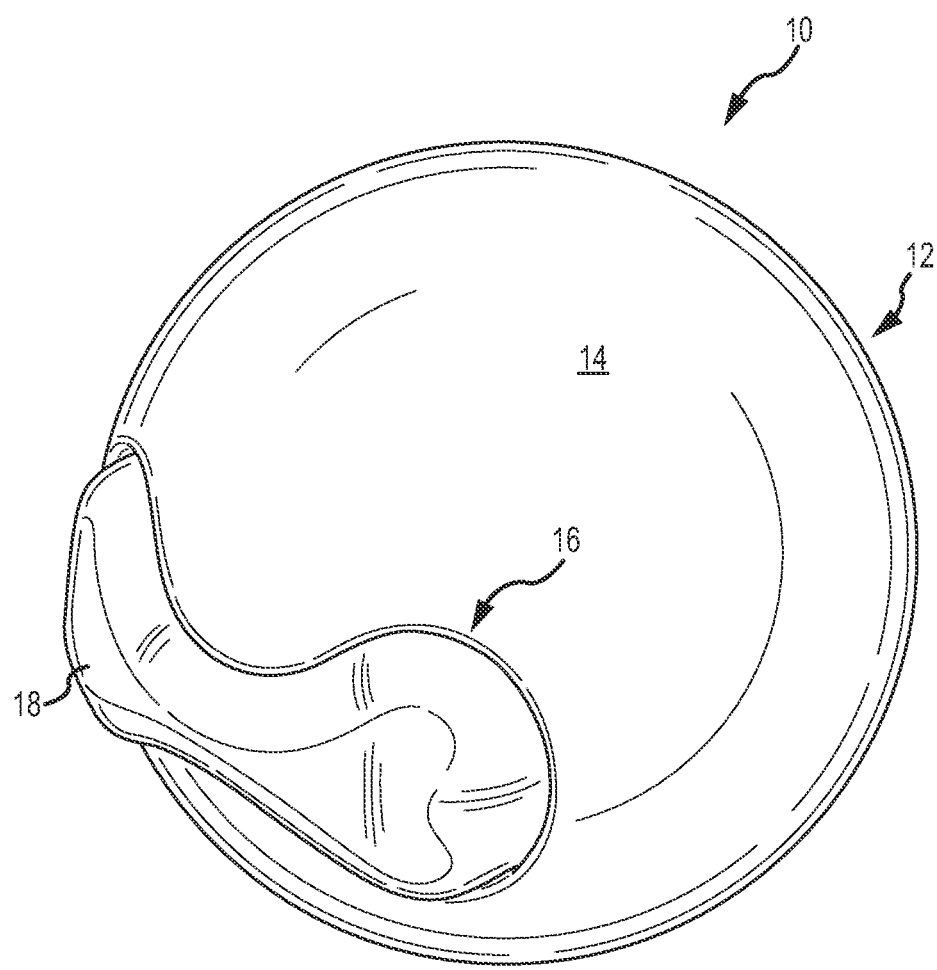
FIG. 1 is a perspective view of a preferred embodiment of the pet toy with treat holding receptacles of the invention.
Figure 3:
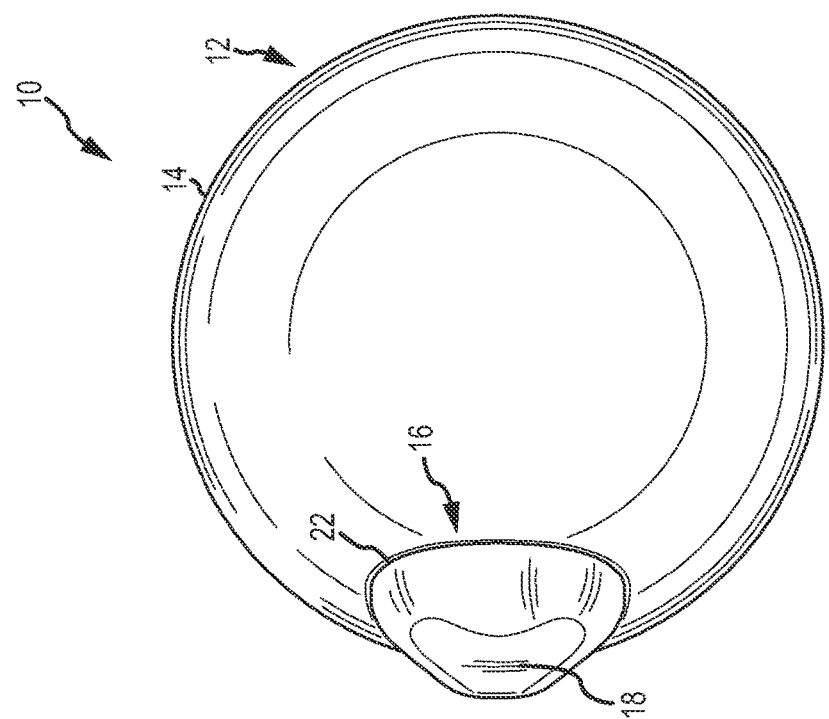
FIG. 3 is a top or plan view of the pet toy.
Figure 2:
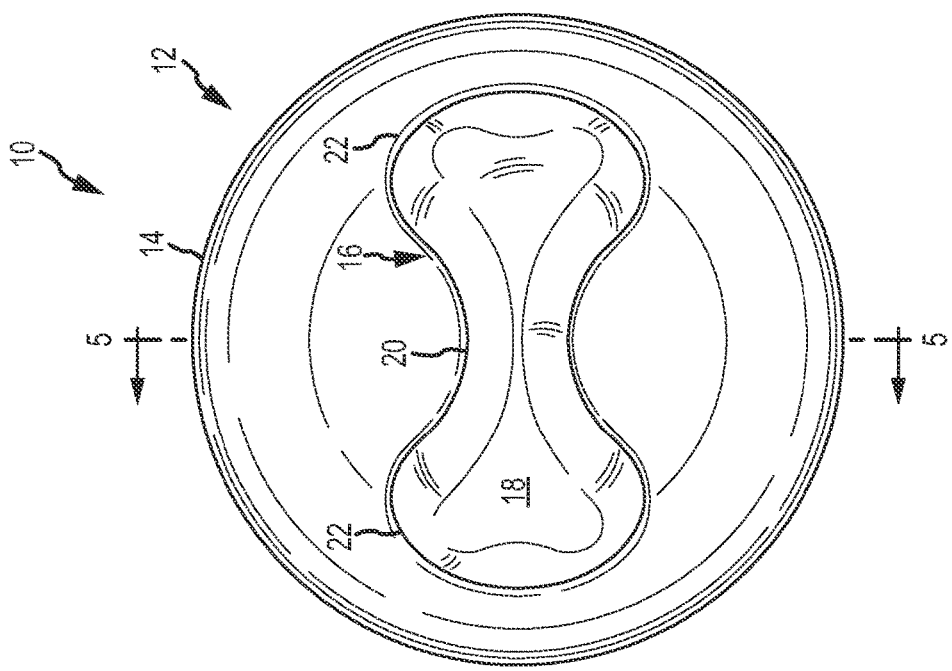
FIG. 2 is a side elevation of the pet toy.

Referring to FIGS. 1-3, a pet toy 10 is shown in a preferred embodiment. Generally, the pet toy includes a spherical or round shaped body 12 and a bone shaped receptacle 16 formed through the exterior surface 14 of the body 12. A bone shaped primary treat 18 is frictionally received within the receptacle 16. The receptacle 16 can be generally characterized as having enlarged or bulbous shaped ends 22 interconnected by a narrower channel portion 20.

The pet toy 10 is preferably made of a resilient elastomeric material, such as rubber or plastic that can withstand the biting action of an animal to prevent pieces from being separated that could be consumed and ingested by the animal.

Figure 4:
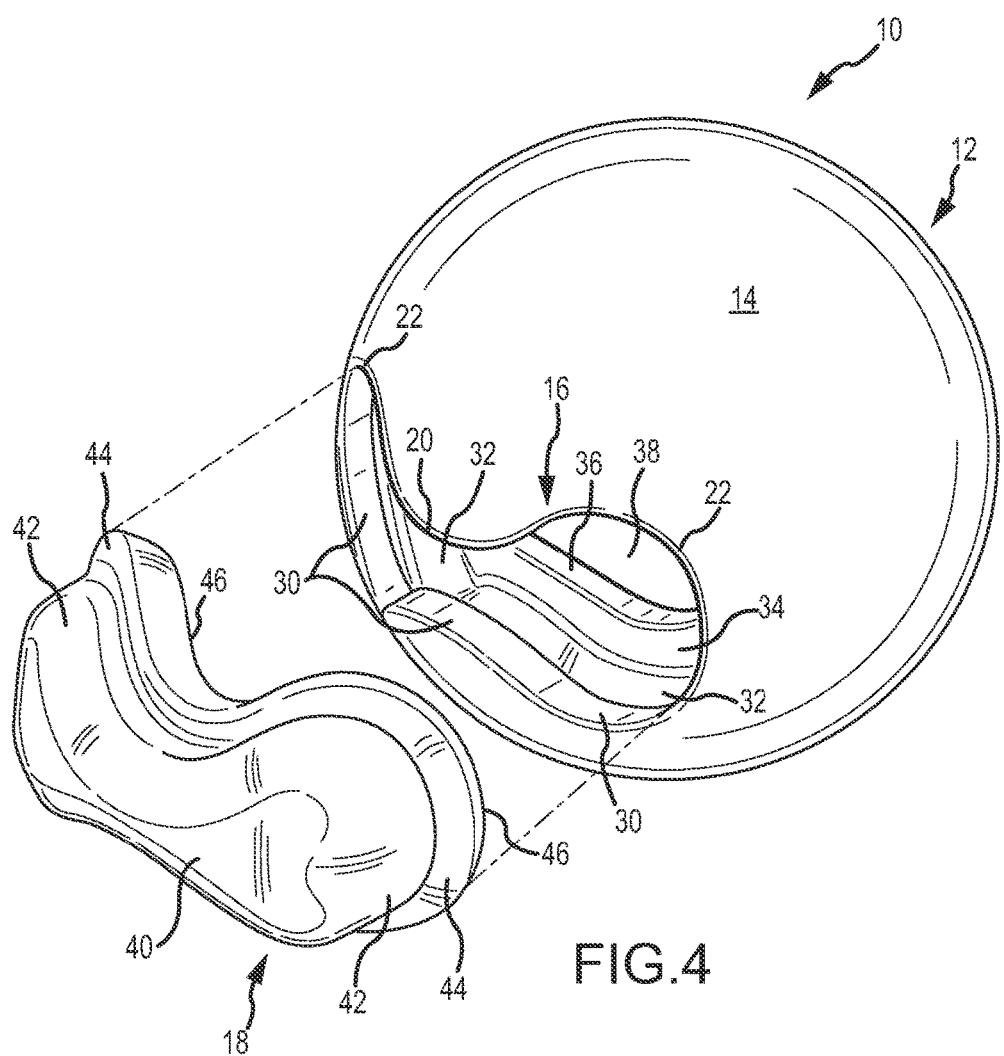
FIG. 4 is an exploded perspective view showing the primary treat removed from its corresponding receptacle.
Figure 5:
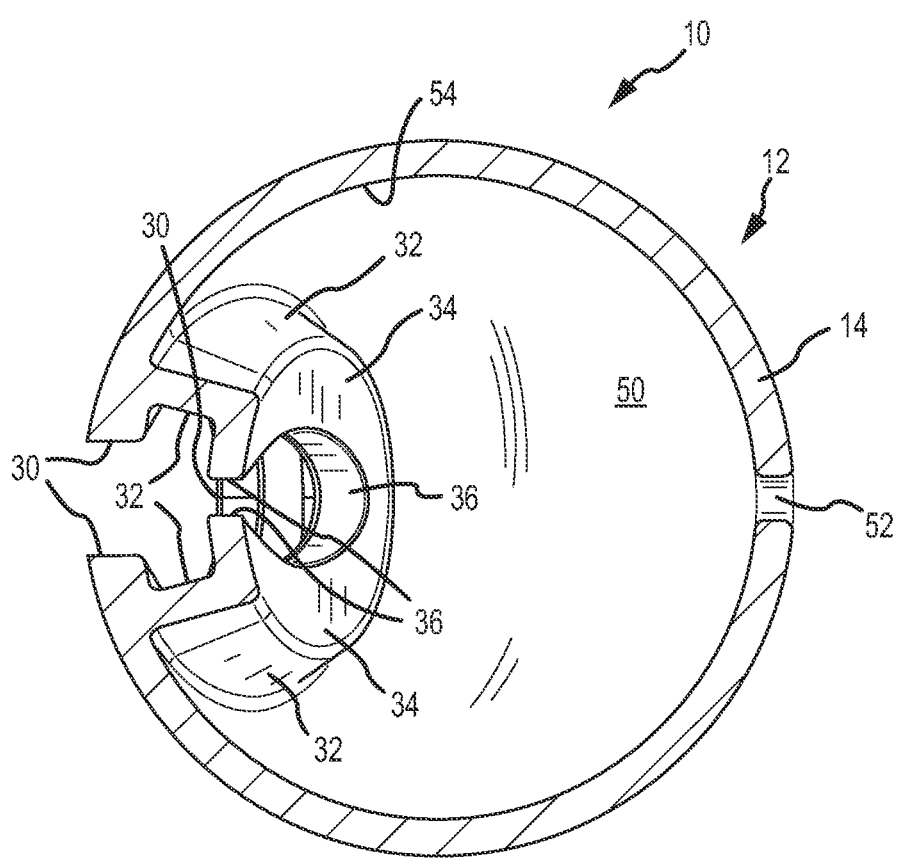
FIG. 5 is a cross-sectional view of the pet toy, taken along line 5-5 of FIG. 2.
Figure 6:
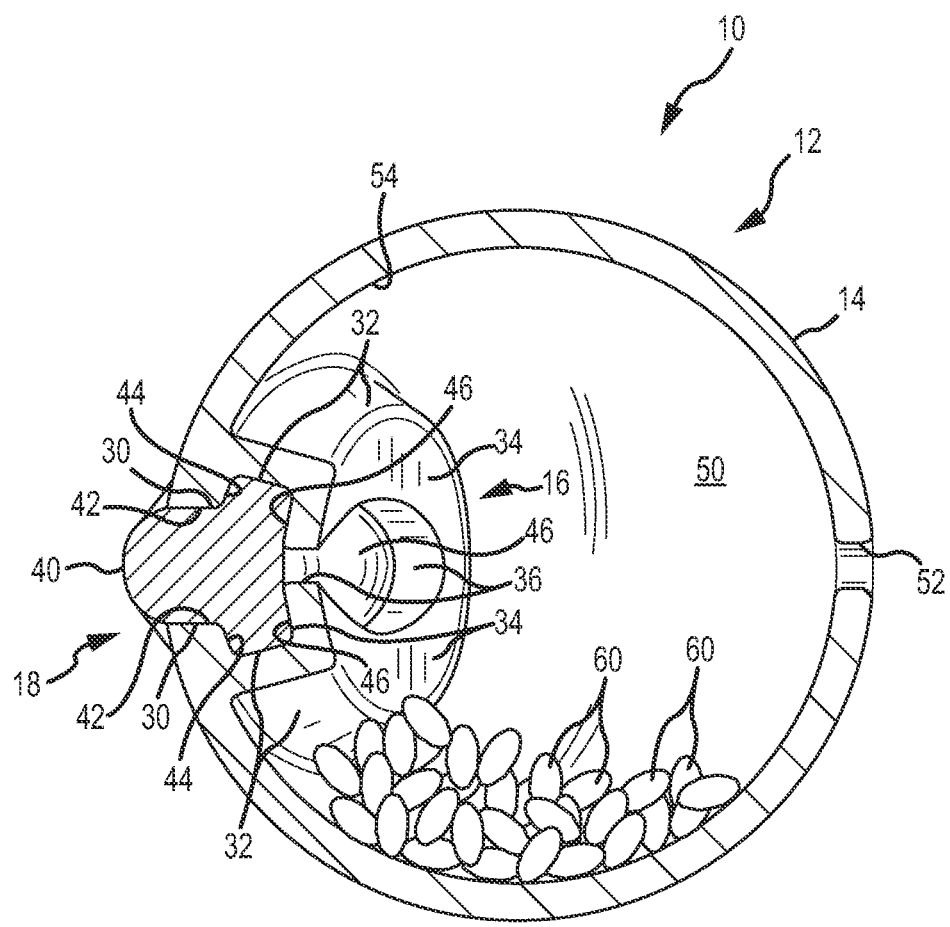
FIG. 6 is a cross sectional view according to FIG. 5 showing the primary treat loaded in the receptacle.

Also referring to FIGS. 4-6, structural details of the receptacle 16 are shown. The receptacle 16 includes a first engaging surface 30 defined by the sidewall of the body 12. Accordingly, the first engaging surface has a substantially uniform thickness. The remaining portion of the receptacle 16 extends into the interior 50 of the body 12, as best seen in FIGS. 5 and 6. This remaining portion includes a sloping and converging interior extension 32 that extends into the interior 50 from the interior surface 54 of the body 12. A rear wall 34 attaches to the interior end of interior extension 32. The rear wall 34 has an opening into the interior 50 of the body 12. Specifically, the rear wall 34 has an opening defined by edges 36 that can be selectively shaped in order to dispense the desired size and type of secondary treats 60 loaded through the opening.

As shown in the preferred embodiment, the opening formed by edge 36 also has a bone shape that generally correspond to the bone shape formed by the first engaging surface 30. However, it shall be understood that this opening can have a different shape, or multiple openings can be provided through the rear wall 34.

As also shown, the receptacle 16 follow the contour or curve of the exterior surface 14 of the body 12 that provides certain advantages as discussed below.

In another aspect of the invention, the interior extension 32 may be considered a second engaging surface and the rear wall 34 can be considered a third engaging surface. Accordingly, the receptacle 16 has three distinct engaging surfaces that allow for varying degrees of frictional engagement to hold the primary treat 18.

The opening through the exterior surface 14 of the body 12 defined by the sidewall 30 can be further described as a first opening, and the opening in the receptacle 16 defined by the edge 36 can be defined as a second opening into the interior of the body 12. The first opening, interior extension 32, and rear wall 34 may further define an open area or volume of the receptacle 16 in which to hold and engage the primary treat 18.

Referring to FIGS. 4 and 6, the primary treat 18 has a center exposed surface 40 that is curved shaped, and generally follows the contour or curve of the exterior surface 14. A first peripheral portion of the treat is defined by a sloping converging extension 42, such that the center exposed surface 40 is raised or protrudes from the toy. A second peripheral portion of the treat 18 is defined by a protruding border or flange 44, and the flange 44 has a thickness that generally corresponds to a combined thickness or depth of the sidewall 30 and interior extension 32. Further, the flange 44 has a chamfer or sloping edge that conforms with the shape of the interior converging extension 32 of the receptacle, such that flange 44 makes frictional contact with the interior converging extension. Accordingly, the primary treat does not require an overlapping lip or flange to be formed on the toy itself to hold the primary treat. The rear or back surface 46 of the treat also generally conforms in shape and size to the rear wall 34, so that the rear surface 46 can be mounted flush against the rear wall 34.

As best seen in FIGS. 3 and 6, when the primary treat 18 is loaded within the receptacle 16, the exposed portion of the treat presents a chamfered or curved surface such that a biting action by an animal on the exposed portion does not allow teeth of the animal to easily pull or dislodge the primary treat from the receptacle. Accordingly, an animal has to spend some time in chewing the primary treat in order to obtain a sufficient hold to dislodge some or the entire treat from the receptacle. As also seen in FIG. 6, there is preferably no appreciable gap between the peripheral edges of the treat 18 and the engaging surfaces of the receptacle thereby preventing the animal from too easily inserting teeth between the edges of the receptacle and the primary treat which otherwise might allow the animal to completely remove the treat in a single biting action. Further, because of the amount of available surface area on the peripheral portions of the treat 18 in contact with the sidewall 30 of the receptacle, the treat is effectively frictionally engaged within the receptacle to prevent the primary treat from simply falling from the receptacle. An air hole 52 formed through the sidewall 30 allows air to escape from the hollow interior of the body and allows air to reenter the interior of the toy as it undergoes deformation or deflection caused by the biting and chewing action of the animal.

In another aspect of the invention, it is contemplated that the particular shape and size of the primary treat can be modified in order to provide the precise amount of frictional contact between the primary treat and the receptacle, thereby defining a level of difficulty for an animal to remove the primary treat. In yet another aspect of the invention, it is contemplated that the particular shape and amount of the exposed exterior surface 40 of the primary treat 18 can be modified to also modify the difficulty for an animal to remove the treat. In the preferred embodiment, the generally chamfered or curved exposed surfaces of the treat 18 make it more difficult for an animal to remove the treat; however, it is also contemplated that the exposed exterior surface 14 of the treat 18 could be presented in a more linear fashion in which opposing sides of the treat 18 could be shaped in a more parallel arrangement, thereby making it easier for an animal to bite and remove the treat.

According to a method of the invention, a user may selectively load different types and sizes of secondary treats 16 through the opening of the receptacle 16. The user may then attach the primary treat by aligning the treat with the receptacle, and pushing the treat into the opening such that the rear surface 46 of the treat sits flush against the rear wall 34. The toy is given to an animal, and the animal commences chewing on the treat and the toy. The sidewall 30 deflects or shifts as the animal chews, thereby providing an animal additional opportunities for dislodging the treat. The air hole 52 allows air to escape and reenter the interior of the toy as it undergoes deformation or deflection caused by the biting and chewing action of the animal. The portion of the primary treat in contact with the engaging surfaces of the receptacle forms a cap or closure, and when all or part of the primary treat is removed, secondary treats may be dispensed through the opening of the receptacle. As the animal continues to interact with the toy, the primary treat may eventually become completely dislodged, and therefore the rate at which secondary treats 60 are dispensed may increase. The pet toy may be reloaded with additional secondary treats and/or loaded within an additional primary treat.

There are numerous advantages to the pet toy and method of the invention. An irregular shaped receptacle provides a large sidewall surface area for frictionally engaging a primary treat without having to form a lip or flange at the sidewall to overlap the peripheral edge of the primary treat. The receptacle also provides options for varying the degree to which an exposed surface of the primary treat is presented to the animal, and the particular shape and amount of the exposed surface to adopt in order to vary the degree of difficulty in accessing and removing the primary treat. The receptacle is sized and shaped so that it generally conforms to the outer exterior surface of the pet toy, making the presentation of the primary treat in a natural and aesthetic manner, as opposed to a non-conforming shaped treat that may protrude awkwardly from the outer surface. The rear wall of the receptacle provides options for determining the size of the opening to dispense secondary treats.

Although the preferred embodiment illustrates a single receptacle, it is contemplated that one or more receptacles may be incorporated on the body, and further in which the one or more receptacles are of the same size, or may have different sizes. Further, the preferred embodiment illustrates a particular shaped receptacle, but it is also contemplated that other irregular shaped receptacles can be provided taking advantage of an increased surface area for which to engage a primary treat.

The preferred embodiment also illustrates a single, unitary primary treat that fully fills the volume of the receptacle. However, it is also contemplated that two or more complementary shaped treats can be used to fill the volume of the receptacle. One example could include two half bone shaped treats separated from one another at the narrower channel portion of the receptacle. Further, the preferred embodiment also illustrates a single solid primary treat, but it is also contemplated that the receptacle can be filled with paste like treats, or a combination of solid and paste like treats.

Although the pet toy and method of the invention have been set forth with respect to one or more preferred embodiments, it shall be understood that the invention can be modified with respect to the various features and advantages disclosed commensurate with the scope of the claims appended hereto.

What is claimed is:

1. A pet toy comprising:
   a flexible body having an exterior surface, an interior surface defining a hollow interior, and a sidewall defining a thickness of said body;
   a receptacle formed through said sidewall, said receptacle having a first opening formed through said sidewall defining a first engaging surface and an open area defining a volume, an interior extension extending generally radially from said interior surface into the hollow interior, a rear wall connected to said interior extension, and a rear wall opening formed through said rear wall and communicating with said hollow interior;
   a primary treat held within said receptacle, and filling at least a portion of said volume, wherein edges of said first opening form a first engaging surface to hold said primary treat, said primary treat having a center-exposed surface that has a curved shape, a sloping converging extension extending from said center-exposed surface, and a protruding flange protruding beyond said sloping converging extension; and
   wherein an edge defining said rear wall opening and said first engaging surface have corresponding bone shapes; wherein the flexible body has an air vent hole on the exterior surface and oriented opposite the receptacle; and wherein a periphery of the air vent hole has a different size than the first opening.

2. A pet toy, as claimed in claim 1, wherein:
   said interior extension has a sloping configuration, and converges toward said rear wall.

3. A pet toy, as claimed in claim 1, wherein:
   said receptacle conforms to a shape of said flexible body.

4. A pet toy, as claimed in claim 1, wherein:
   said flexible body is elastomeric; and
   said interior extension forms a flange projecting into the hollow interior from said interior surface of said body.

5. A pet toy, as claimed in claim 1, wherein:
   said primary treat has a shape, and said receptacle has a corresponding shape to receive said primary treat.

6. A pet toy, as claimed in claim 1, further including:
at least one secondary treat placed in said hollow interior of said body and retained in said hollow interior by said primary treat when said primary treat is held within said receptacle, said secondary treat not attached to said primary treat.

7. A pet toy, as claimed in claim 1, wherein:
said primary treat is frictionally held within said receptacle by engagement with at least one of said sidewall and said interior extension of said receptacle.

8. A pet toy, as claimed in claim 1, further including:
an air aperture formed through said sidewall to allow air to escape from said hollow interior and to allow air to reenter the hollow interior as said flexible body undergoes deformation or deflection caused by an animal.

9. A method of providing at least one treat to an animal by a toy loaded with said treat, said method comprising:
providing: (i) a flexible body having an outer surface, an interior surface defining a hollow interior, a sidewall defining a thickness of said body; and (ii) a receptacle formed through said sidewall, said receptacle defining a first engaging surface and having an open space defining a volume, said receptacle defined by a first opening formed through said sidewall, an interior extension extending generally radially from said interior surface, a rear wall connected to said interior extension, and a second opening formed through said rear wall and communicating with said hollow interior, wherein an edge of said first opening extends over said open space of said receptacle;
providing a primary treat placed within said receptacle to fill at least a portion of said volume, said primary treat having a center-exposed surface that has a curved shape, a first peripheral portion defined by a sloping converging extension, and a second peripheral portion defined by a protruding flange, wherein an edge defining said second opening and said first engaging surface have corresponding bone shapes; wherein the flexible body has an air vent hole on the outer surface and oriented opposite the receptacle; and wherein a periphery of the air vent hole has a different size than the first opening;
positioning said primary treat so said protruding flange makes frictional contact with the interior extension; and
giving the toy loaded with the primary treat to the animal.

10. A method, as claimed in claim 9, further including:
providing at least one secondary treat; and
before placing said primary treat within said receptacle, placing said at least one secondary treat in said hollow interior of said body through said second opening formed through said rear wall of said receptacle, wherein, after placing said primary treat in said receptacle, said primary treat forms a closure of said receptacle.

11. A method, as claimed in claim 10, wherein:
said primary treat does not extend beyond said rear wall into said hollow interior;
said at least one secondary treat is retained loosely within said hollow interior, and not attached to said primary treat; and
said rear wall of said receptacle is located radially inward of said interior surface of said body by a distance substantially equal to a length of said interior extension.

12. A method, as claimed in claim 9, wherein said flexible body further includes an air aperture formed through said sidewall to allow air to escape from, and reenter, said hollow interior as said flexible body undergoes deformation or deflection caused by the animal.

* * * * *